July 6, 1948.  C. L. PETERSON  2,444,466
SCRAPING DEVICE FOR ROTARY DRUM FILTERS
Filed Nov. 23, 1943  2 Sheets-Sheet 1

C. LYNN PETERSON
INVENTOR.

BY
ATTORNEY

July 6, 1948. C. L. PETERSON 2,444,466
SCRAPING DEVICE FOR ROTARY DRUM FILTERS
Filed Nov. 23, 1943 2 Sheets-Sheet 2

C. LYNN PETERSON
INVENTOR.

BY
*N. A. McGrew*
ATTORNEY

Patented July 6, 1948

2,444,466

UNITED STATES PATENT OFFICE 2,444,466

SCRAPING DEVICE FOR ROTARY DRUM FILTERS

C. Lynn Peterson, Salt Lake City, Utah, assignor to Peterson Filters and Engineering Co., Salt Lake City, Utah, a partnership Application November 23, 1943, Serial No. 511,413

4 Claims. (Cl. 210—201)

This invention relates to scraping devices, and more particularly to scraping devices for removing material from a surface, as in filtering apparatus wherein cake deposited upon a filter medium is to be removed.

In filtering apparatus, successive portions of a filter medium are moved through a body of fluent matter—which may consist of solid particles suspended in liquid— and the liquid or filtrate is drawn through the filtering medium by a suction or vacuum effect while solid particles are deposited upon the surface of the filtering medium section. After the section of the filtering medium has passed out of the body of fluent matter, the deposited cake may be washed or sprayed, as by water, and the cake then removed by the mechanical action of a scraping device adjusted to ride against or closely approach the surface. Normally, the action of the scraping device is enhanced by air under pressure discharged through the filter medium to loosen and/or partially remove the deposited cake. In such operations, if the scraping device is inaccurately adjusted, or warped or twisted with respect to the filter surface, there is a tendency for the deposited cake to remain on the surface. Cake remaining on the surface not only reduces the amount of new cake that can be deposited during the next and subsequent movements of the filter medium through the body of fluent matter, but also, after a period of time, tends to become hard and dense, thus reducing the effective surface area and reducing the capacity of the filter.

In drum type filters, the periphery of a rotating drum is provided with a filter medium, the lower portion of the drum rotates through a body of fluent matter, and the drum is divided into sections which are subjected to successive vacuum and pressure influences through suitable valve connections. The deposited cake is subjected to a wash or spray adjacent the top of the drum, and the cake is removed at a point on the rear side of the drum (with respect to the direction of rotation) just before each section enters the body of fluent matter. The scraping devices heretofore in use comprise an apron or blade pivoted about a fulcrum and attached to a fulcrum arm. The fulcrum is normally located about midway of the blade, and the position of the blade is determined by a rod or the like adjustably connected to the fulcrum arm. Such scraping devices have not been entirely successful, because difficulty is always encountered in adjusting both ends of the blade to the desired distance from the filter medium surface of the drum. Normally, such adjustment requires the blade to be twisted from one end to the other. As the blades are never quite true, it is difficult, if not impossible, to adjust one end of the blade without affecting the other end. Attempts to overcome this difficulty by longer levers or fulcrum arms, so that one end of the blade could be set and pressure exerted to bring the other end to the desired adjustment, have not been successful. Such adjustment places a tension upon the blade throughout its length, which eventually works out, leaving the blade too close or too far away from the surface.

Among the objects of this invention are to provide a new and novel scraping device; to provide such a scraping device which is particularly useful in removing material from a surface; to provide such a scraping device which is particularly useful in filtration apparatus, such as a drum type filter; to provide such a scraping device which may be positioned accurately and will maintain its position during use; to provide such a scraping device in which either end may be adjusted independently of the other end; to provide such a scraping device which is rugged in construction, yet may be adjusted with a high degree of accuracy; and to provide such a scraping device which is relatively simple in construction and applicable to many different types of apparatus.

Other objects and novel features of this invention will become apparent from the description which follows.

In general, this invention may be embodied in a scraping device provided with a blade, movable toward and away from a surface from which material is to be removed, by a translating motion, rather than by a swinging motion or in an arc as in previous scraping devices. Also, a support is provided adjacent each end of the scraping device, so that each end of the blade may be adjusted substantially independently of the other end. Preferably, sufficient freedom of movement is permitted each end when the other end is being adjusted, so that warping or twisting of the blade is avoided. Thus, the scraping device may include a pair of translatable supports for moving the blade toward and away from the surface at each of two spaced points. Also, a guide for each support may be provided which is adjustable in a direction substantially transverse to the direction in which the support is translatable. Other features of this invention are incorporated in a preferred embodiment of this invention illustrated in the accompanying drawings, in which:

Figure 1:
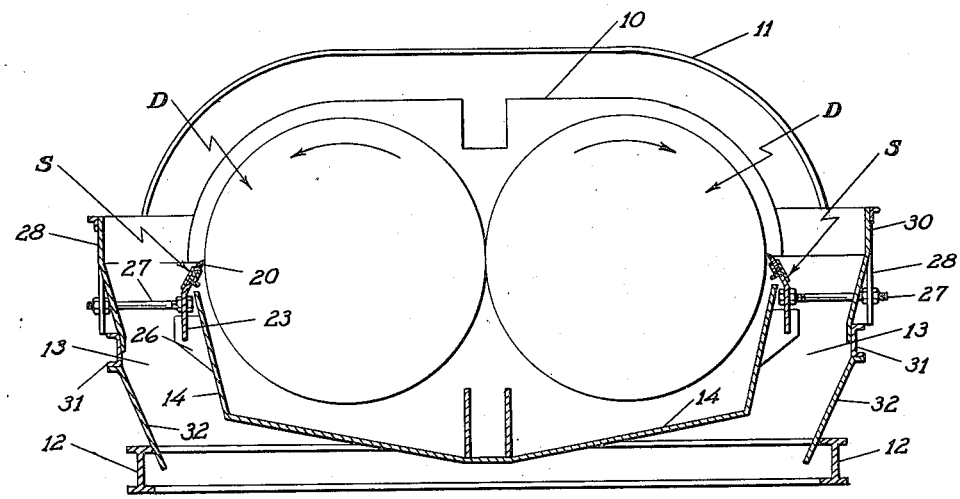
Fig. 1 is a cross section of filtering apparatus which includes a pair of scraping devices constructed in accordance with this invention.

As in Fig. 1, a pair of scraping devices S constructed in accordance with this invention may be incorporated in filtering apparatus of the type described and claimed in my copending application Serial No. 504,831, filed October 4, 1943. Such apparatus includes a pair of drums D rotated in opposite directions, and disposed so as to be in relatively close contact along a tangential line, substantially coinciding in this instance with the horizontal center lines of the drums. A body of fluent matter to be filtered is contained in the space between and above the drums, and seals are provided at each end, such as by a block 19 which is adapted to contact the end of each drum and extends from above the drums to a point below the line of tangency. The block 10 is supported by and adjustable from a framework 11, or any other suitable support, and the entire apparatus is supported upon a framework which includes I-beams 12. The cake removed from the drums is preferably directed by the scraping devices into a cake-collecting channel 13, one side of which is formed by the underside of a fluent matter collecting pan 14, which prevents drippage—some of which cannot normally be avoided—from contaminating the removed cake. The cake is removed for suitable disposal or conveyed to a place of subsequent treatment.

The cake is deposited by gravity and wave effect, as well as the suction effect by which the filtrate is drawn through the filter medium. In such apparatus, it is desirable that the deposited cake be removed with a high degree of accuracy, since cake left on the under sides of the drums passes up between the drums and tends to crush or otherwise damage the filtering medium when passing through the line of substantial tangency of the drums.

Figure 2:
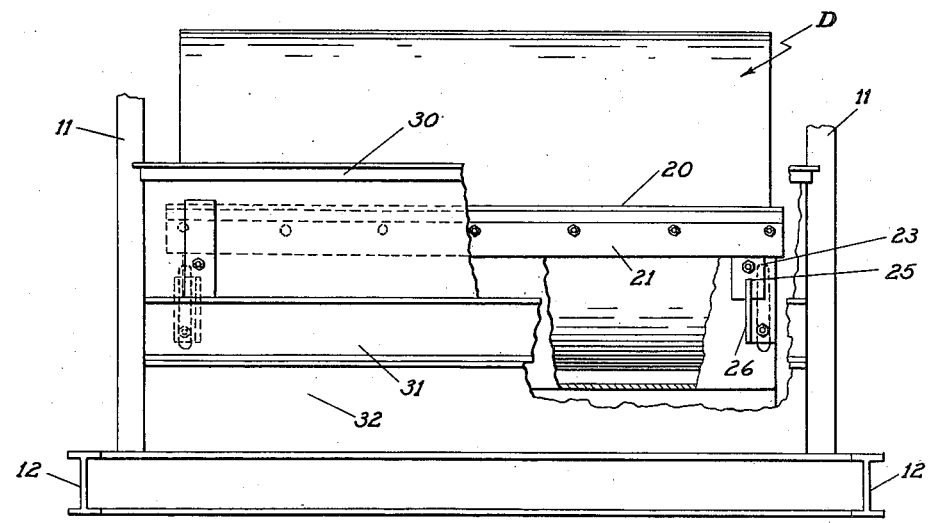
Fig. 2 is an end elevation of the filtering apparatus, certain parts being broken away to show the construction more clearly.

Each scraping device S, constructed in accordance with this invention, includes a blade or apron 20 adapted to remove deposited cake from the peripheral surface of a drum. The blades are positioned on opposite sides of the drums D, at or about the center line of each drum, though other positions may be found desirable. As illustrated more clearly in Figs. 2 to 4, inclusive, each blade 20 is slightly longer than the length of the drum and extends horizontally along the drum. The blade is clamped between an outer plate 21 and an inner plate 22, fastened in a suitable manner, as by bolts. A supporting bar 23 is attached to the outer plate adjacent each end thereof, in a suitable manner, as by welding, and the blade is maintained in position between the plates by an angle 24, which also imparts stiffness to the blade and the assembly. However, any other suitable manner of maintaining the relative position of the blade with respect to the supporting plates may be utilized.

In accordance with this invention, the assembly including the blade and the angle is translatable toward and away from the periphery of the drum D, rather than being pivoted and rotatable. For this purpose, each bar 23 is provided with a slot 25, as in Fig. 2, into which the web of a slide rail 26 fits, the top of the slide rail being maintained in a substantially horizontal position. The slide rail is adjustable in a general vertical direction along the side wall of collecting pan 14, by adjustment along a vertical slot in the collecting pan through which a bolt extends, as shown, or any other suitable manner. An adjusting rod 27 is attached to each bar 23, so that the position of either bar may be changed as desired and the blade thereby adjusted at either end independently of the opposite end. The outer end of each rod is adjustable inwardly and outwardly by means of nuts, as shown, or in any other suitable manner, with respect to a vertically mounted angle 28 attached to a side plate 30 in a suitable manner, as by welding. Side plate 30, a channel 31, and a lower plate 32 form the outside wall of cake-collecting channel 13, and channel 31 forms a support for side plates 30 and lower plate 32.

Figure 4:
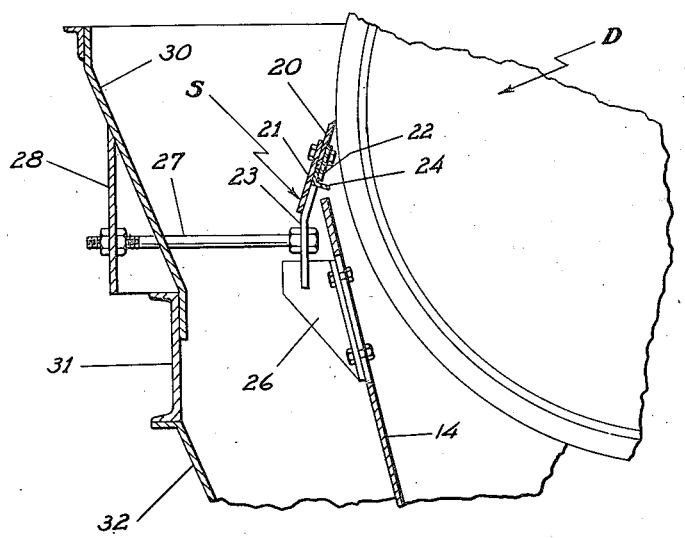
Fig. 4 is an enlarged partial cross sectional view, illustrating more clearly details of the scraping device of this invention.
Figure 3:
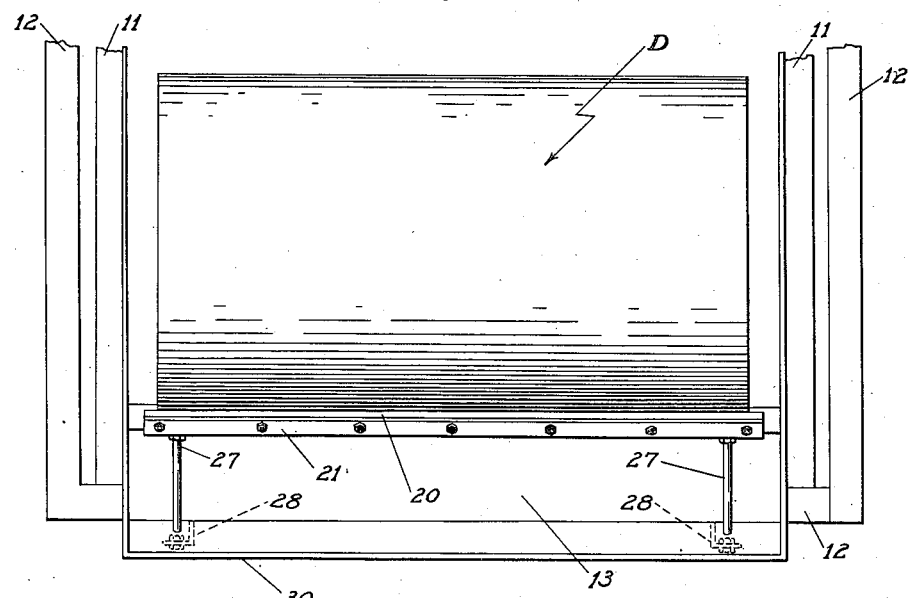
Fig. 3 is a partial top plan view of the apparatus.

As in Figs. 3 and 4, each adjusting rod 27 extends through the side plate and the adjusting nuts are on the outside of the apparatus, so that removed cake will not be deposited thereon. In adjusting the scraping device of this invention, the slide rails 26 may be adjusted to a suitable position, and one end of the blade 20 moved in toward the peripheral surface of the drum until the desired relatively close spacing is obtained. Thereafter, the other end of the blade is adjusted until the desired spacing is obtained at that end. When the desired spacing is obtained at both ends, the blade will be spaced at the desired distance throughout its length.

To change the spacing of the blade it is necessary only to adjust the rods 27. To move the blade upwardly or downwardly to a new position, it is necessary only to adjust the slide rails upwardly or downwardly, after which the blade may be adjusted inwardly or outwardly by rods 27. Since the blade is maintained in a relatively straight position, being clamped between the outer and inner plates, and the outer and inner plates are kept straight by angle 24, there is little or no opportunity for distortion or twisting of the blade. Therefore, there is no distortion to work out, and the blade will remain in the desired position.

There are numerous advantageous features of the scraping device of this invention. These include the independent adjustment at each end, the translating movement of adjustment, and the stiffness of the blade occasioned by angle 24 and the clamping plates 21 and 22. A further advantage of the scraping device lies in the fact that the blade, when worn, may readily be removed for grinding or resharpening, or be replaced by a sharp blade, a new blade, or the like. Also, the accuracy with which the blade may be adjusted is much greater than in the case of a pivoted blade, since the inward movement of the blade can be controlled with considerable accuracy by the nuts on adjusting rods 27. A slight adjustment of the nuts on rods 27 effects only a slight movement of the blade toward or away from the surface of the drum. However, in the prior pivoted type of blade, the fulcrum arm is usually much shorter than the apron or blade and greater care must be taken in adjustment, since movement of the fulcrum arm through a slight angle will result in a considerable movement of the apron or blade.

From the foregoing, it is apparent that the scraping device of this invention may be adjusted readily and accurately, will maintain its setting during use, yet is rugged and simple in construction. It will be evident that such a scraping device may be easily applied to various types of apparatus, including filters and the like.

It will be understood that various changes may be made, as in the shape or position of the supports, relative position of the blade around the periphery of the drum, the shape of the blade and the supports therefor, the position and configuration of the slide rails, the length of the adjusting rods, and the portions of the apparatus to which the parts of the scraping device are attached. It will also be apparent that the scraping device may be utilized with single drum filters, disc filters, or other types of apparatus in which material is to be removed from a surface. It will further be apparent that the connection between the supporting bars and slide rails may vary from that described, and that adjustment of the ends of the scraping device may be obtained by means other than rods, such as by cams, adjusting screws or other suitable devices.

It will further be understood that other embodiments of this invention may exist, and that changes other than those enumerated may be made, all without departing from the spirit and scope of this invention.

What is claimed is:

1. In filtration apparatus, including a filtering medium movable along a path which includes passage through a body of fluent matter for the deposition of a cake of solid particles thereon and movement in a generally downward direction for the removal of such deposited cake; a scraping device comprising a blade extending horizontally across the surface of said filtering medium at the cake removal position; a horizontally adjustable support adjacent each end of said blade; and a vertically adjustable guide for each support having a substantially horizontal guide surface along which said support is movable.

2. A filter comprising a drum provided with a filter medium about its periphery, said drum being rotatable through a body of fluent matter; means for producing a vacuum influence to effect the deposition of a cake of solid particles upon the surface of said filter medium; a cake removing blade extending longitudinally of said drum on the downwardly moving side of said drum; walls forming a cake removal channel beneath said blade; a support for said blade adjacent each end thereof and movable translatably toward and away from said drum; a guide for each support attached to one wall of said channel and having a guide surface extending transverse to the direction of movability of the support; and adjustable means for changing the position of the support and extending through the opposite wall of said channel.

3. A filter as defined in claim 2, in which said guides are attached to the inner wall of said channel adjacent said drum; and said adjustable means which extends through the outer wall of said channel is adjustable from outside said filter.

4. A filter comprising a drum provided with a filter medium about its periphery, said drum being rotatable through a body of fluent matter; means for producing a vacuum influence to effect the deposition of a cake of solid particles upon the surface of said filter medium; a cake removing blade extending longitudinally of said drum on the downwardly moving side of said drum; spaced walls providing a cake removal channel, the inner wall extending beneath said blade and disposed adjacent said drum; a support for said blade adjacent each end thereof and movable horizontally toward and away from said drum; a guide for each support having a vertically and outwardly extending leg having a substantially horizontal upper surface, each guide being attached to the inner wall of said channel and adjustable vertically thereon and each support having a slot fitting over the vertical leg of a guide; and an adjusting rod attached to each support and extending through the opposite wall of said channel, said rods being adjustable from the exterior of said filter.

C. LYNN PETERSON.

REFERENCES CITED

The following references are of record in the file of this patent:

UNITED STATES PATENTS

| Number | Name | Date |
|---|---|---|
| 374,598 | Harris | Dec. 13, 1887 |
| 397,181 | Gorham et al. | Feb. 5, 1889 |
| 963,186 | Trump | July 5, 1910 |
| 1,415,859 | Bates | May 16, 1922 |
| 1,516,702 | Berry | Nov. 25, 1924 |
| 1,946,039 | Staritzky | Feb. 6, 1934 |
| 2,270,938 | Doescher | Jan. 27, 1942 |
| 2,271,385 | Best | Jan. 27, 1942 |

FOREIGN PATENTS

| Number | Country | Date |
|---|---|---|
| 7,723 | Great Britain | 1900 |
| 292,939 | Germany | July 5, 1916 |